UNITED STATES PATENT OFFICE 2,435,947

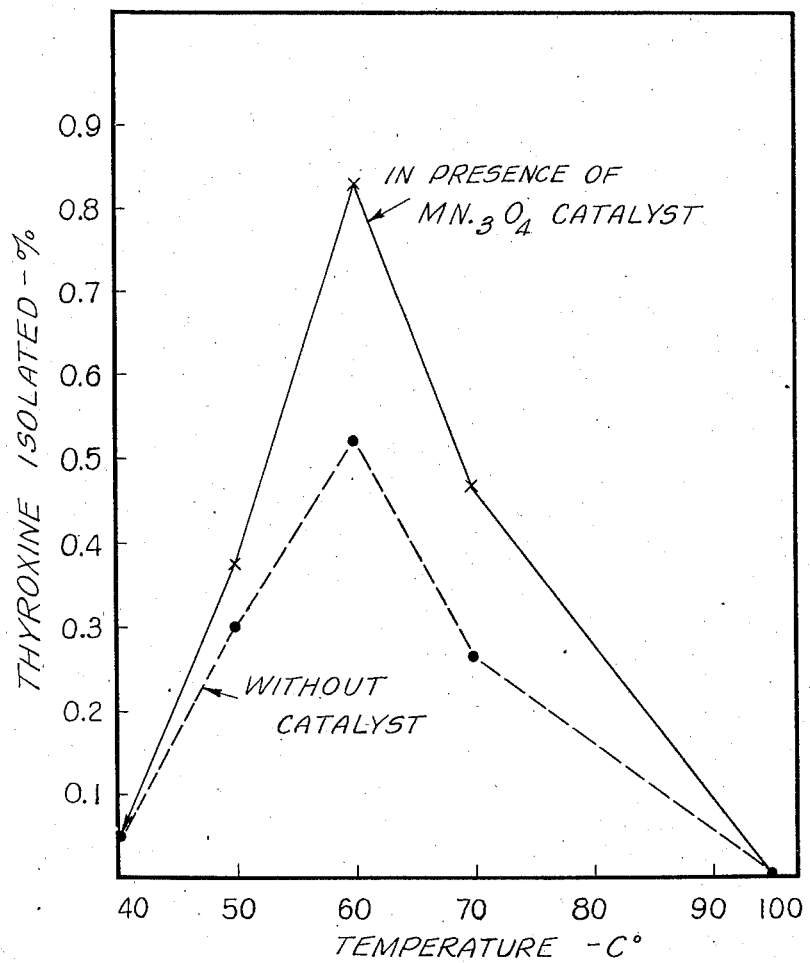

PRODUCTION OF THYROXINE FROM DIIODOTYROSINE

Charles W. Turner, Columbia, Mo., and Ezra P. Reineke, East Lansing, Mich., assignors to American Dairies Incorporated, Kansas City, Mo., a corporation of Maryland, and The Quaker Oats Company, Chicago, Ill., a corporation of New Jersey, jointly Application November 2, 1945, Serial No. 626,424

13 Claims. (Cl. 260—519)

This invention relates to improvements in the production of thyroxine from diiodotyrosine and refers more particularly to a method by which an increased amount of high quality biologically active thyroxine is produced from the originating substance. This application is a continuation-in-part of Serial No. 496,952, filed January 31, 1943, now Patent No. 2,422,938, issued June 24, 1947, and Serial No. 589,248, filed April 19, 1945.

It has been known in the art that traces of thyroxine can be produced from diiodotyrosine and research workers in this field have incubated the product in mildly alkaline solutions at temperatures of the order of 37° C. Increased yields have been reported by adding hydrogen peroxide at steam bath temperatures, then mixing with normal butanol to extract the thyroxine as formed.

The instant procedure is an improvement over what has gone before and substitutes for conventional practice additional steps, the use of a catalytic material and the incorporation of oxygen during the incubation period to obtain an increased yield of the product. Laboratory tests indicated that when sufficient iodine was combined with a protein to substitute two atoms per molecule of tyrosine, the amount of thyroxine formed can be influenced by the temperature of incubation and the presence of a selected catalyst. This leads to the belief that conditions favorable for maximum formation of thyroxine in iodinated proteins would also influence the formation of thyroxine from diiodotyrosine.

In experiments conducted to determine the effect of these factors 21.6 grams (0.05 mol.) of diiodotyrosine were dissolved in 700 ml. of alkaline solution and incubated for 18 to 20 hours at the selected temperature. However, satisfactory results can be obtained with incubation periods varying from 10 hours to 72 hours or more to obtain the desired results. The solutions were stirred continuously by means of stirring motors adjusted to approximately 600 R. P. M. In the preliminary experiments an attempt was made to determine the most desirable medium for the conversion of diiodotyrosine to thyroxine. To do this, results obtained with N/1-sodium hydroxide, N/10-sodium hydroxide and 7% sodium carbonate ($Na_2CO_3$) were compared. In all cases 21.6 grams of diiodotyrosine were dissolved in 700 ml. of each solution and incubated at 70° C. with vigorous stirring for 20 hours. Under these conditions diiodotyrosine was highly stable in N/1-sodium hydroxide (NaOH), only traces of acid-insoluble material being formed. Crystalline thyroxine was recovered after incubation in both the sodium carbonate and N/10-sodium hydroxide solutions. Considerably more oxidative side reactions appeared to occur in the sodium carbonate ($Na_2CO_3$) than in the N/10-sodium hydroxide (NaOH) medium, since the acid-insoluble precipitate obtained was darker and a smaller yield of thyroxine was obtained. Thyroxine formation will occur with a broad range of concentrations of both diiodotyrosine and sodium hydroxide in the solutions incubated so long as the two are combined in such proportions as to hold the pH of the solutions within the range of approximately 8.5 to 11. For instance, if 20 gm. of diiodotyrosine are used, approximately 700 ml. of one-tenth normal, or 70 ml. of one normal sodium hydroxide is required to maintain the requisite conditions for thyroxine formation. Subsequent preparations were incubated in N/10-sodium hydroxide solutions and the effect on thyroxine formation of various factors was determined. Under the conditions used the solutions remained at a pH of approximately 9.4 to 9.6 throughout the process.

Investigations were then conducted to determine the influence and effect of incubation temperature on the amount of thyroxine formed under the conditions selected, and the effect exerted by a catalytic material such as manganese oxide ($Mn_3O_4$). To answer these questions diiodotyrosine solutions were incubated at varying temperatures within the range of 40° C. to 94° C. After incubation each solution was subjected to an isolation procedure hereinafter described. At each temperature interval one sample was incubated at N/10-sodium hydroxide alone; to a second sample, otherwise treated identically with the first, 2 grams of manganese oxide ($Mn_3O_4$) was added.

The drawing which accompanies this specification shows graphically the percentage of thyroxine isolated at the temperatures employed, the full line of the graph indicating recoveries of thyroxine when using the catalyst, the dotted line recoveries when the catalyst was not used.

At 40° C. only a trace of thyroxine was formed amounting to gross yields of 0.03% and 0.04%. With both types of treatment thyroxine formation increased rapidly with increasing temperature until the optimum of 60° C. was reached. Thereafter there was a decline in the amount of thyroxine recovered, with zero recovery at 94° C. Throughout the effective temperature range there was an increased recovery of thyroxine from the samples incubated in the presence of manganese oxide ($Mn_3O_4$).

The maximum yield of thyroxine obtained at the optimum incubation temperature of 60° C. was 183 mg., equivalent to a gross yield of 0.85%. However, of the diiodotyrosine initially processed, all but 6.5 grams on the average can be recovered after separating the thyroxine. Based on this figure the net yield of thyroxine is 2.8%.

In addition to the variable results with respect to yield illustrated by the graph, the incubation system employed provided an opportunity to study the effect of such factors as the amount of stirring and aeration on the process of thyroxine formation. Some of the preparations were aerated continuously during incubation by bubbling finely dispersed air through them. Both the stirring and aeration were omitted in others, although the surface of the solutions was constantly in contact with the atmosphere. Other conditions being held constant, practically identical yields of thyroxine were obtained where the solutions were stirred vigorously or aerated as indicated in table below. With the stirring and aeration omitted, only traces of thyroxine were recovered. This was true even when the usual amount of catalyst was added. Thus, it is evident that the formation of thyroxine can be brought about under these conditions by the incorporation of atmospheric oxygen. Manganese oxides ($Mn_3O_4$) will effectively catalyze the reaction but the catalyst is ineffective in the absence of oxygen. In addition to $Mn_3O_4$, other manganese compounds, including $MnSO_4$, $MnO$, $Mn_2O_3$, or the mixture of manganese oxides formed by the reduction of $KMnO_4$ with glucose, effectively catalyze the reaction.

TABLE

*Effect of stirring and aeration on formation of thyroxine from diiodotyrosine*

| Incubation Temperature, °C. | Thyroxine Yield, % | Procedure |
|---|---|---|
| 40 | 0.042 | $Mn_3O_4$, 2 gm.; stirred at 600 R. P. M. |
| 40 | 0.042 | $Mn_3O_4$, 2 gm.; aerated vigorously. |
| 50 | 0.382 | $Mn_3O_4$, 2 gm.; stirred at 600 R. P. M. |
| 50 | 0.365 | $Mn_3O_4$, 2 gm.; aerated vigorously. |
| 60 | 0.025 | $Mn_3O_4$, 2 gm.; no stirring or aeration. |
| 70 | 0.269 | No catalyst; stirred at 600 R. P. M. |
| 70 | 0.011 | No catalyst; no stirring or aeration. |
| 60 | 0.85 | $Mn_3O_4$, 2 gm.; stirred vigorously. |

We have also found that the concentration of catalyst used is not critical, satisfactory results being obtained when manganese catalyst in amounts equivalent to 0.1% to 20% by weight of the diiodotyrosine used is added.

The thyroxine formed during the incubation period may be protected by the use of varying quantities of n-butyl alcohol as suggested in our preceding application referred to. The thyroxine was isolated after incubation by a procedure more or less conventional to the art. In the earlier tests the reacted solutions were diluted with six volumes of distilled water. Dilute sulfuric acid ($H_2SO_4$) was added until the reaction became faintly acid to congo red (pH 5.0) and the dark, flocculent precipitate was collected by centrifuging at once. A part of the unaltered diiodotyrosine usually crystallizes out of the supernatant solution after standing for a few hours. In some of the later tests in which it was desired to recover the unchanged diiodotyrosine as completely as possible, the acid-insoluble material was precipitated by dilute hydrochloric acid (HCl) directly to the undiluted reaction mixture in an amount sufficient to redissolve the diiodotyrosine that crystallized at about pH 5.0. The acid-insoluble substance still remained precipitated and could be recovered by centrifuging. The diiodotyrosine was recovered from the supernatant solution by first adding saturated sodium hydroxide (NaOH) to make it slightly alkaline and then acidifying with glacial acetic acid ($CH_3COOH$), whereupon the diiodotyrosine crystallized at once.

In either case the acid-insoluble precipitate was dissolved in 300 ml. of N/10-sodium hydroxide (NaOH) solution and then sufficient dilute hydrochloric acid (HCl) was added to produce a definitely yellow color when the solution was tested with bromcresol-green indicator.

The thyroxine was extracted by shaking the acidified solution successively with 300 ml. and 150 ml. of normal butanol, and separating after each mixture in a separatory funnel. The normal butanol extract was then shaken successively with 450 ml., 225 ml., and 100 ml. of 2-normal sodium hydroxide (NaOH) to remove alkali-soluble impurities. The normal butanol extract was filtered and the solvent was removed by vacuum distillation. The residue remaining after removal of the normal butanol was dissolved in 100 ml. of N/10 normal sodium hydroxide (NaOH). Then dilute acetic acid ($CH_3COOH$) was added until a flocculent, light-yellow precipitate formed. The precipitate was washed several times with 5% acetic acid ($CH_3COOH$) solution and finally dissolved in a minimum of boiling sodium carbonate ($Na_2CO_3$) solution. The precipitate was mixed with 5 ml. to 15 ml. of N/10-sodium carbonate ($Na_2CO_3$) solution and then saturated sodium carbonate ($N_2CO_3$) was added dropwise in an amount just sufficient to dissolve the precipitate. A heavy white precipitate of the monosodium salt of thyroxine usually appeared immediately when the solution was cooled.

The solution was left in the refrigerator over night, and then the monosodium thyroxine was recovered by centrifuging, dissolved in 70% alkaline alcohol, and centrifuging to remove the trace of undissolved material. When a few drops of glacial acetic acid ($CH_3COOH$) were added to the boiling solution, thyroxine crystallized at once in the typical bundles of microscopic needles.

A total of 2.012 grams of thyroxine obtained from these experiments was pooled and recrystallized twice from sodium carbonate ($Na_2CO_3$) solution. The pure white monosodium salt was then dissolved in 70% alkaline alcohol and free thyroxine was crystallized from the boiling solution by the addition of acetic acid ($CH_3COOH$). As suggested, thyroxine appeared at once as the typical bundles of microscopic needles in a yield of 1.416 grams. The melting point when heated at the rate of 3° per minute was 230° C.–231° C. Analysis showed 65.2% iodine compared to the theoretical 65.4%.

Thus it will be seen that a definite temperature optimum for the formation of thyroxine from diiodotyrosine occurs at 60° C. Incubation at 40° C., the temperature commonly employed, yields only a trace of thyroxine in a 20 hour period. Likewise, the reaction is augmented by the catalyst, manganese oxide $Mn_3O_4$, and other manganese compounds, when oxygen is added. The importance of atmospheric oxygen is evident since only traces of thyroxine were formed unless air was incorporated in the solution either by stirring or direct aeration. This is true even at the optimum temperature and in the presence of the catalyst.

Workers in the art have proposed the formation of thyroxine in iodinated protein by the oxidative coupling of two molecules of diiodotyrosine with the elimination of one side chain. The procedure recommended that oxidation be brought about by the action of hypoiodite. If these teachings were followed, thyroxine formation should continue even in the absence of additional oxygen. From the results presented in table above, it is obvious that under the conditions used aeration of solutions is essential for the formation of appreciable amounts of thyroxine. It thus appears unlikely that hypoiodite plays an important role in the reaction.

From the fact that manganese will catalyze thyroxine formation only in the presence of oxygen, it appears to act as an oxygen carrier for the oxidative coupling reaction that is apparently involved.

Thus it will be seen that the invention is well adapted to attain the ends and objects hereinbefore set forth, together with other advantages which are obvious and inherent to the process. There has been produced an increased yield of thyroxine from diiodotyrosine by control of temperature to an optimum, the addition of oxygen and the use of a selected catalytic material.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth is to be interpreted as illustrative and not in a limiting sense.

Having thus described our invention, we claim:

1. A method of synthesizing thyroxine from diiodotyrosine comprising the steps of incubating the diiodotyrosine in an alkaline solution with aeration at temperatures of 50° to 70° C. and extracting the thyroxine from the mixture.

2. A method of synthesizing thyroxine as in claim 1 in which aeration is effected by stirring the solution with its surface exposed to an oxygen-containing gas.

3. A method of synthesizing thyroxine as in bating solution is N/10-sodium hydroxide.

4. A method as in claim 1 in which the incubating solution is sodium hydroxide having a pH of 8.5 to 11.

5. A method as in claim 1 in which the incubating solution is a solution of sodium bicarbonate.

6. A method as in claim 1 in which aeration is effected by passing air through the solution.

7. A method of synthesizing thyroxine from diiodotyrosine comprising the steps of incubating diiodotyrosine in an alkaline solution with aeration at temperatures of 50° to 70° C. in the presence of a catalyst and extracting the thyroxine from the mixture.

8. A method of synthesizing thyroxine as in claim 7 in which an oxygen-containing gas is passed through the solution to effect aeration thereof.

9. A method as in claim 7 in which the incubating solution is N/10-sodium hydroxide.

10. A method as in claim 7 in which the incubating solution is a solution of sodium bicarbonate.

11. A method as in claim 7 in which air is passed through the solution for aeration.

12. A method as in claim 7 in which an oxide of manganese is used as the catalyst.

13. A method as in claim 7 in which a mixture of the oxides of manganese is used as the catalyst.

CHARLES W. TURNER.
EZRA P. REINEKE.

REFERENCES CITED

The following references are of record in the file of this patent:

UNITED STATES PATENTS

| Number | Name | Date |
| --- | --- | --- |
| 2,130,985 | Lantenschlager et al. | Sept. 20, 1938 |
| 2,309,404 | Kraft et al. | Jan. 26, 1943 |
| 2,379,842 | Turner et al. | July 3, 1945 |

FOREIGN PATENTS

| Number | Country | Date |
| --- | --- | --- |
| 659,497 | Germany | May 4, 1938 |

OTHER REFERENCES

Ludwig et al., Zeit fur Physiol. Chem., vol. 258, pp. 195–211 (1939).

Mutzenbecker, Zeit fur Physiol. Chem., vol. 261, pp. 253–256 (1939).

Barkdoll et al., Jour. Am. Chem. Soc., vol. 66, pp. 898–899 (1944).

Block, Jour. Biol. Chem., vol. 135, pp. 51–52 (1940).

Johnson et al., Chem. Abstracts, vol. 36, col. 3162–3163 (1942).